US008621989B2

(12) United States Patent
van der Ent

(10) Patent No.: US 8,621,989 B2
(45) Date of Patent: Jan. 7, 2014

(54) FOOD MANUFACTURING APPARATUS AND RELATED METHOD

(75) Inventor: Hans van der Ent, Hof Bruheza (NL)

(73) Assignee: Franz Haas Waffel- und Keksanlagen-Industrie GmbH, Leobendorf (AT)

( * ) Notice: Subject to any disclaimer, the term of this patent is extended or adjusted under 35 U.S.C. 154(b) by 871 days.

(21) Appl. No.: 12/287,131

(22) Filed: Oct. 6, 2008

(65) Prior Publication Data

US 2010/0083848 A1    Apr. 8, 2010

(51) Int. Cl.
*A23G 1/10*    (2006.01)

(52) U.S. Cl.
USPC ............... 99/485; 99/426; 99/407; 99/404; 99/393; 99/357; 99/355; 99/354; 99/323.4; 99/323.9; 99/323.11; 426/113; 426/231; 426/512; 426/514; 426/516; 426/549

(58) Field of Classification Search
CPC ............. A23P 1/00; A23P 1/12; A21C 11/16
USPC .......... 99/426, 407, 404, 393, 357, 355, 354, 99/353, 352, 323.4–323.9, 323.11; 426/113, 231, 512, 514, 516, 549
See application file for complete search history.

(56) References Cited

U.S. PATENT DOCUMENTS

| 2,549,881 | A | * | 4/1951 | Berg et al. | 99/579 |
| 2,833,654 | A | * | 5/1958 | Sonnenshein et al. | 426/390 |
| 2,917,008 | A | * | 12/1959 | Kipnis | 99/353 |
| 3,178,770 | A | * | 4/1965 | Willis | 425/76 |
| 3,689,276 | A | * | 9/1972 | Kummer et al. | 99/333 |
| 6,079,323 | A | * | 6/2000 | Dzenis | 99/454 |
| 6,561,235 | B2 | * | 5/2003 | Finkowski et al. | 141/172 |
| 2006/0107844 | A1 | * | 5/2006 | Haslund | 99/450.1 |
| 2007/0065550 | A1 | * | 3/2007 | Rivero et al. | 426/515 |
| 2007/0184161 | A1 | * | 8/2007 | McDonnell et al. | 426/502 |
| 2008/0075817 | A1 | * | 3/2008 | Backus et al. | 426/389 |

* cited by examiner

*Primary Examiner* — Henry Yuen
*Assistant Examiner* — Brett Spurlock
(74) *Attorney, Agent, or Firm* — Laurence A. Greenberg; Werner H. Stemer; Ralph E. Locher

(57) ABSTRACT

The invention is directed to a food manufacturing apparatus comprising a feed system for inputting a plurality of materials, an extruder and a cutting assembly. The extruder comprises a pump system and a rotating extrusion die removably connected to the pump system, wherein the rotating extrusion die comprises at least one product channel for receiving and extruding the plurality of materials. The cutting assembly comprises at least one groove and a wire attached through the groove. The feed system is attached to the extruder and the cutting assembly is located at a position to cut the extruded plurality of materials with the wire from the rotating extrusion die.

10 Claims, 6 Drawing Sheets

FOOD MANUFACTURING APPARATUS AND RELATED METHOD

BACKGROUND OF THE INVENTION (1) Field of the Invention

The present invention relates to an apparatus for manufacturing food, more particularly for manufacturing cookies, and even more particularly, but not by way of limitation, to a cookie manufacturing apparatus with a modular extruder capable of depositing extruded product at a speed substantially equal to the speed of a transport mechanism.

(2) History of the Related Art

Systems for the production of cookies have been common in the cookie industry since the early twentieth century. Historically, however, cookie production was a mostly manual procedure. Individuals manually procured and extruded dough into a defined shape, and manually prepared the extruded materials for production. As is the case with most manual tasks, this procedure was slow, imprecise, and inefficient. With the advent of cookie machinery, materials may now be extruded automatically and deposited from the machine in a consistent and repetitive manner.

Modern cookie machinery, however, has created new issues of concern. The modern cookie marketplace demands quantity, economical prices, and variety. For cookie making machines, these objectives translate into the manufacturing goals of versatility and speed. In cookie machinery known in the art, however, extruders are limited to an attached input feed system. If, for example, one production task involves extruding dough and another involves extruding aerated creams such as whipped cream, two different cookie making machines are usually utilized. Further, while some machines are somewhat adaptable to the speed of a conveyor belt or other transport mechanism, they involve moving a complete extruder, with all of its cables and tubes, making maintenance frequent, costly, and problematic.

SUMMARY OF THE INVENTION

The invention is directed to a food manufacturing apparatus comprising a feed system for inputting a plurality of materials, an extruder and a cutting assembly. The extruder comprises a pump system and a rotating extrusion die removably connected to the pump system, wherein the rotating extrusion die comprises at least one product channel for receiving and extruding the plurality of materials. The cutting assembly comprises at least one groove and a wire attached through the groove. The feed system is attached to the extruder and the cutting assembly is located at a position to cut the extruded plurality of materials with the wire from the rotating extrusion die.

The invention is additionally directed to a food manufacturing apparatus comprising a feed system for inputting a plurality of materials, an extruder and a cutting assembly. The extruder comprises a pump system and an extrusion die removably connected to the pump system, wherein the extrusion die comprises at least one product channel for receiving and extruding the plurality of materials. The cutting assembly comprises at least one groove and a wire attached through the groove. The feed system is removably attached to the extruder and the cutting assembly is located at a position to cut the extruded plurality of materials with the wire from the extrusion die.

The invention is further directed to a food manufacturing apparatus comprising a feed system for inputting a plurality of materials, an extruder and a cutting assembly. The extruder comprises a pump system and an extrusion die removably connected to the pump system, wherein the extrusion die comprises at least one product channel for receiving and extruding the plurality of materials. The cutting assembly comprises at least one groove and a wire attached through the groove. The feed system is removably attached to the extruder and the cutting assembly is located at a position to cut the extruded plurality of materials with the wire moving in a substantially vertical motion from the extrusion die.

BRIEF DESCRIPTION OF THE DRAWINGS

A full and enabling disclosure of the present invention, including the best mode thereof directed to one of ordinary skill in the art, is set forth in the specification, which refers to the appended Figures, in which.

Figure 1:
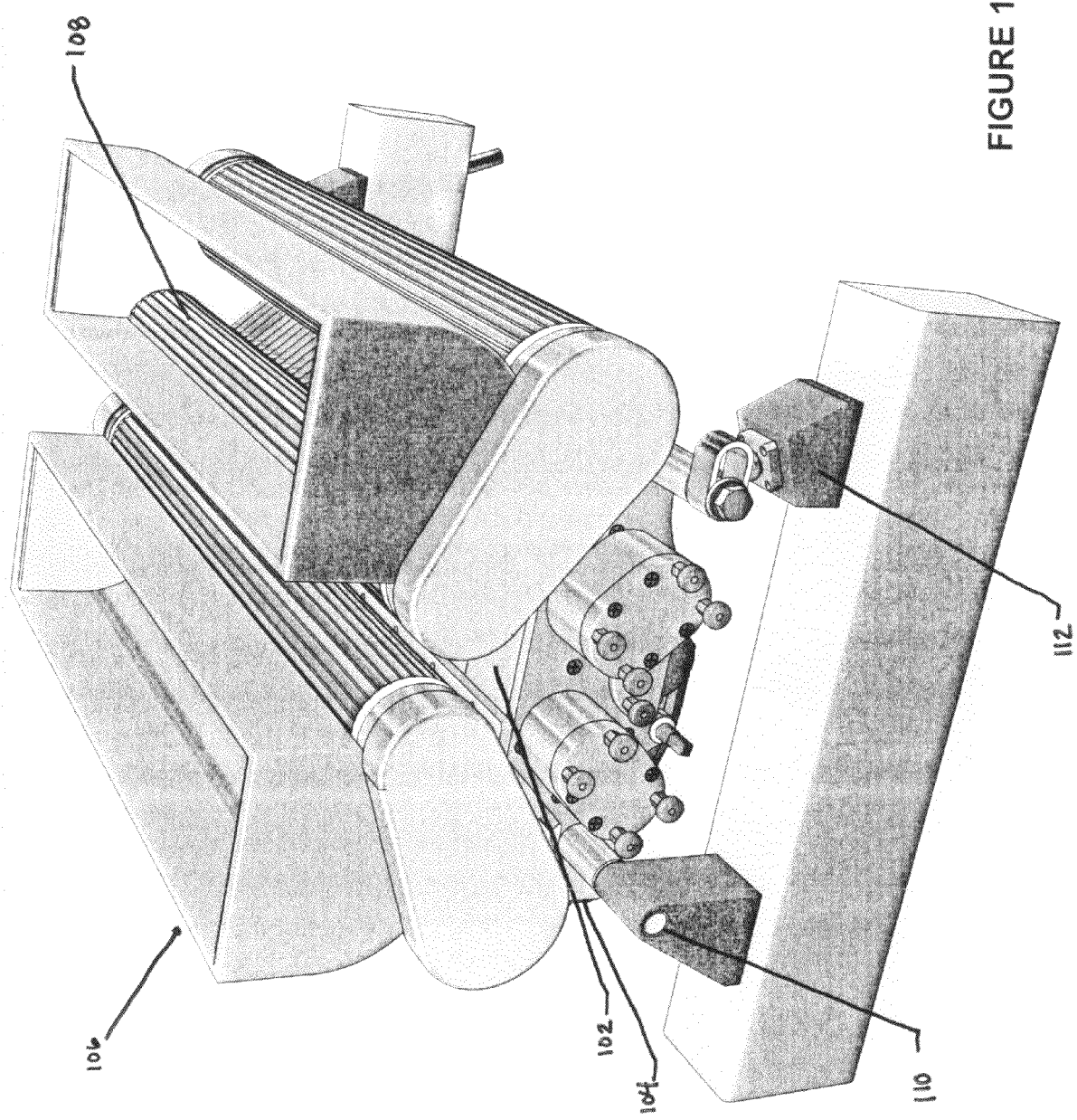
FIG. 1 is a perspective view of an apparatus according to an embodiment of the invention.

Repeat use of reference characters in the present specification and drawings is intended to represent same or analogous features or elements of the invention.

DETAILED DESCRIPTION OF THE PREFERRED EMBODIMENTS

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment.

Thus, it is intended that the present invention covers such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

The present invention is designed to accurately produce a diverse array of food products, including but not limited to cookies that may contain any combination of creams, jellies, caramels, chocolates, and aerated creams such as marshmallow, whipped cream, and ice cream. Embodiments of the present invention are further capable of extrusion of single or double masses in co-extrusion and triple-extrusion. The widths of the extruded food products in various embodiments of the invention may include widths of 800 mm, 1000 mm, 1200 mm, and 1500 mm.

With a flexible extrusion system, in an embodiment, the present invention allows the use of multiple product lanes, permitting virtually any variety of products to be produced. By changing the product-specific stencil die, any number of lanes of product may be produced. Further, it is not necessary to replace an expensive pump housing as the stencil-die may be changed within minutes by qualified technicians.

Using fill-width pumps with positive displacement, provided with extra large diameter lobes, the present invention is gentle to the product. Even masses containing large particles may be successfully pumped. The complete extruder, including the pump system, may be thoroughly jacketed, providing complete temperature control of any masses used. Through double or triple extrusion, it is even possible to use different temperatures at each pump (e.g., cooling when using chocolate chip dough and/or heating to an exact temperature when using caramel or creams).

The range of food products that may be produced with the present invention includes but is not limited to the following: 1) Extruded product single mass; 2) Extruded product double mass (e.g., fruit or fig bars); 3) Extruded product triple mass; 4) Wire cut products single mass; 5) Wire cut products double mass; 6) Wire cut products triple mass; 7) Intermittent depositing of products with single mass; 8) Intermittent depositing of products with double mass; 9) Intermittent depositing of products with triple mass; and 10) Depositing of products in a variety of different shapes.

FIG. 1 overviews an embodiment of the present invention. The primary components of the embodiment are a standard extruder assembly 102 containing the extrusion system of the present invention, a wire cutting assembly 104 for cutting extruded product, and an input feed system 106 for feeding product into the extruder 102, which in this embodiment is a system of open hoppers with driven feed rolls 108. The embodiment of FIG. 1 is further equipped with a pivot stand 110 to support the machine and a jack 112 enabling the machine itself to be raised or lowered. FIG. 1 depicts a machine equipped for two-color extrusion, although the present invention is not limited to two-color extrusion.

Figure 2:
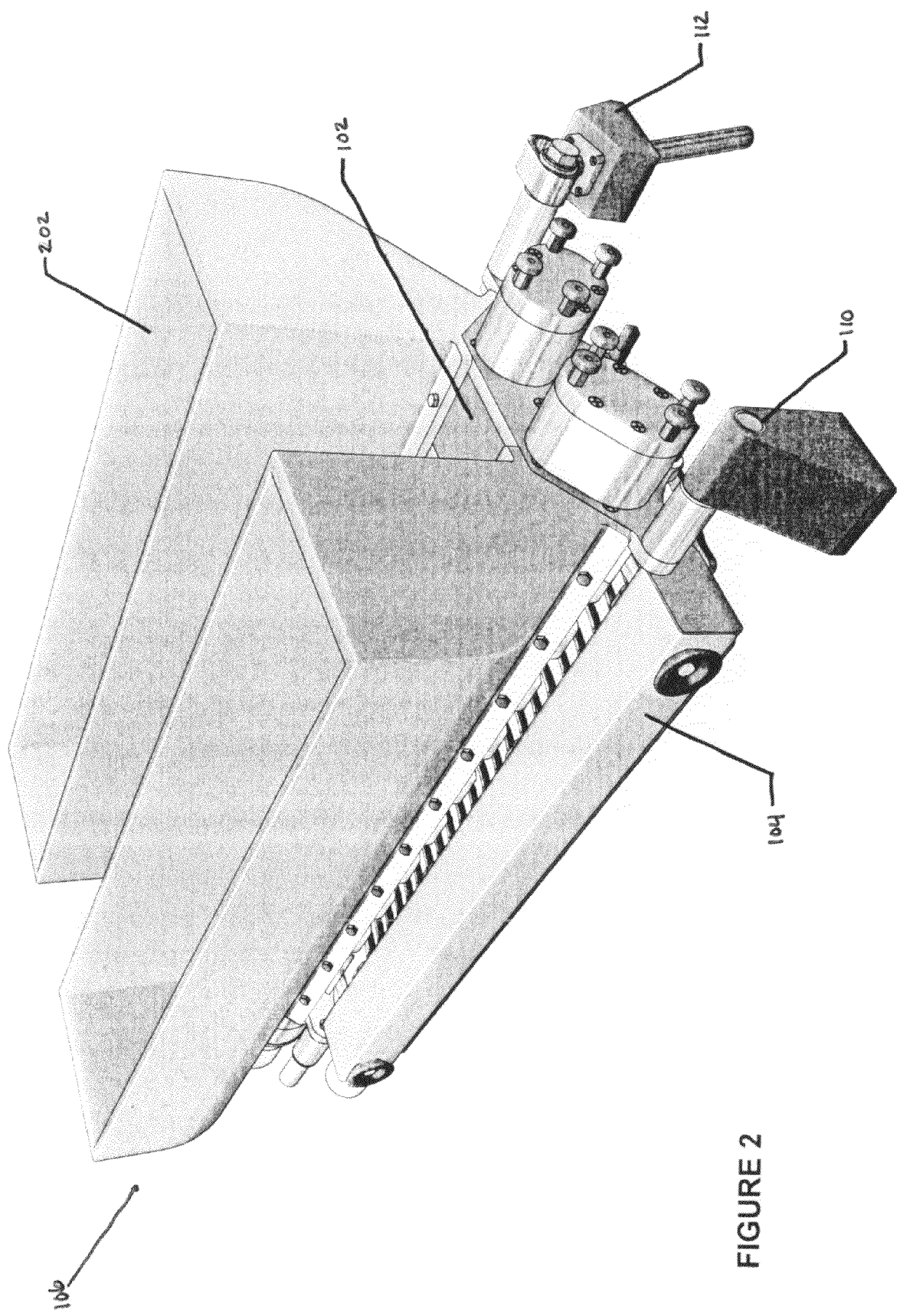
FIG. 2 is a perspective view of an apparatus according to an embodiment of the invention.
Figure 3:
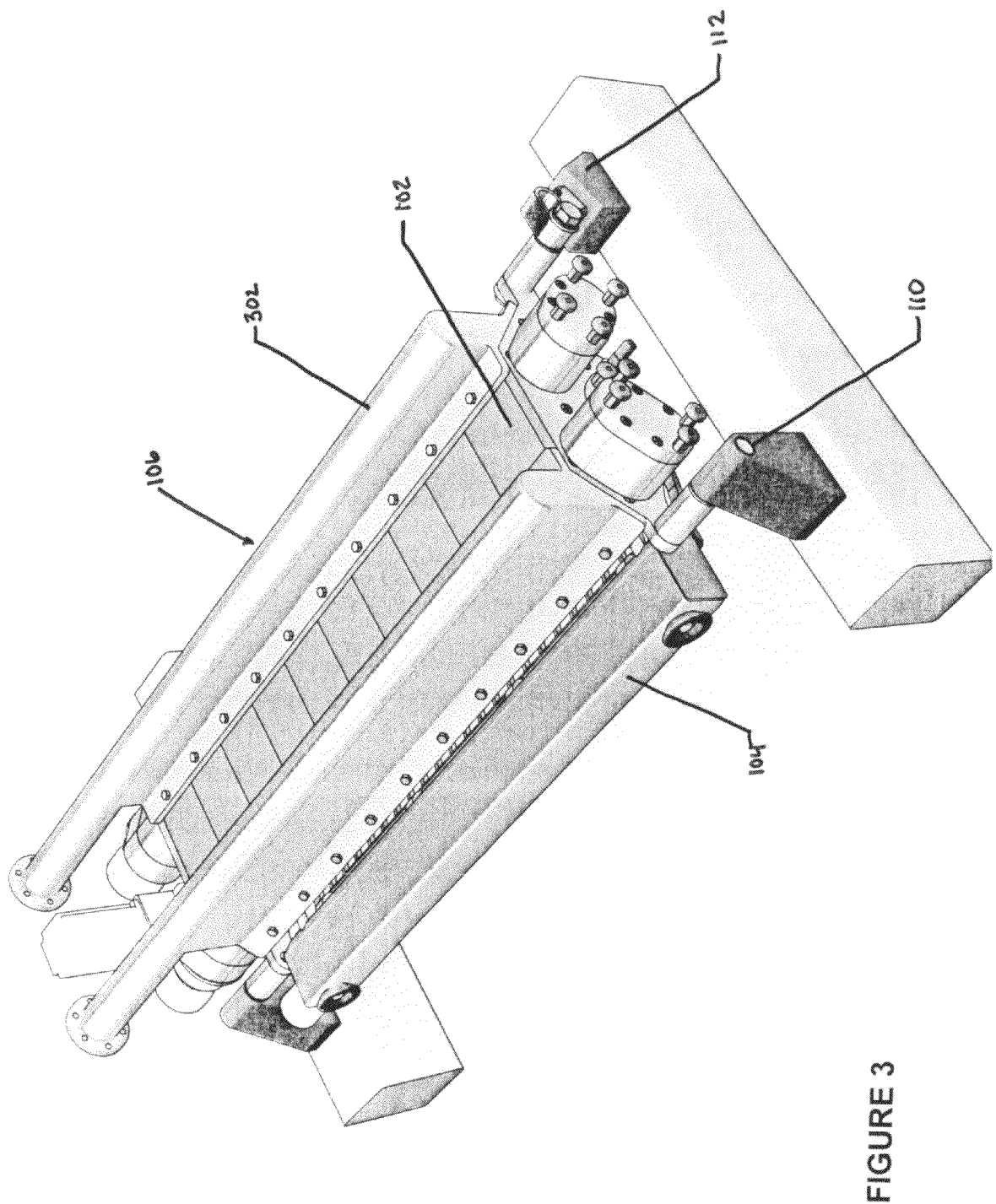
FIG. 3 is a perspective view of an apparatus according to an embodiment of the invention.

FIGS. 2 and 3 depict the adaptability of the present invention to different types of food manufacturing. FIG. 2 shows the same apparatus as depicted in FIG. 1 except that the input feed system 106 has been replaced with stainless steel open hoppers 202 instead of open hoppers with driven feed rolls. The stainless steel open hoppers 202 may be useful in manufacturing where the inputted materials' temperatures must be regulated. Similarly, FIG. 3 shows another variation of FIG. 1, wherein the input feed system 106 is comprised of closed manifolds 302, which may be useful for feeding aerated creams such as whipped creams and ice cream.

Figure 4:
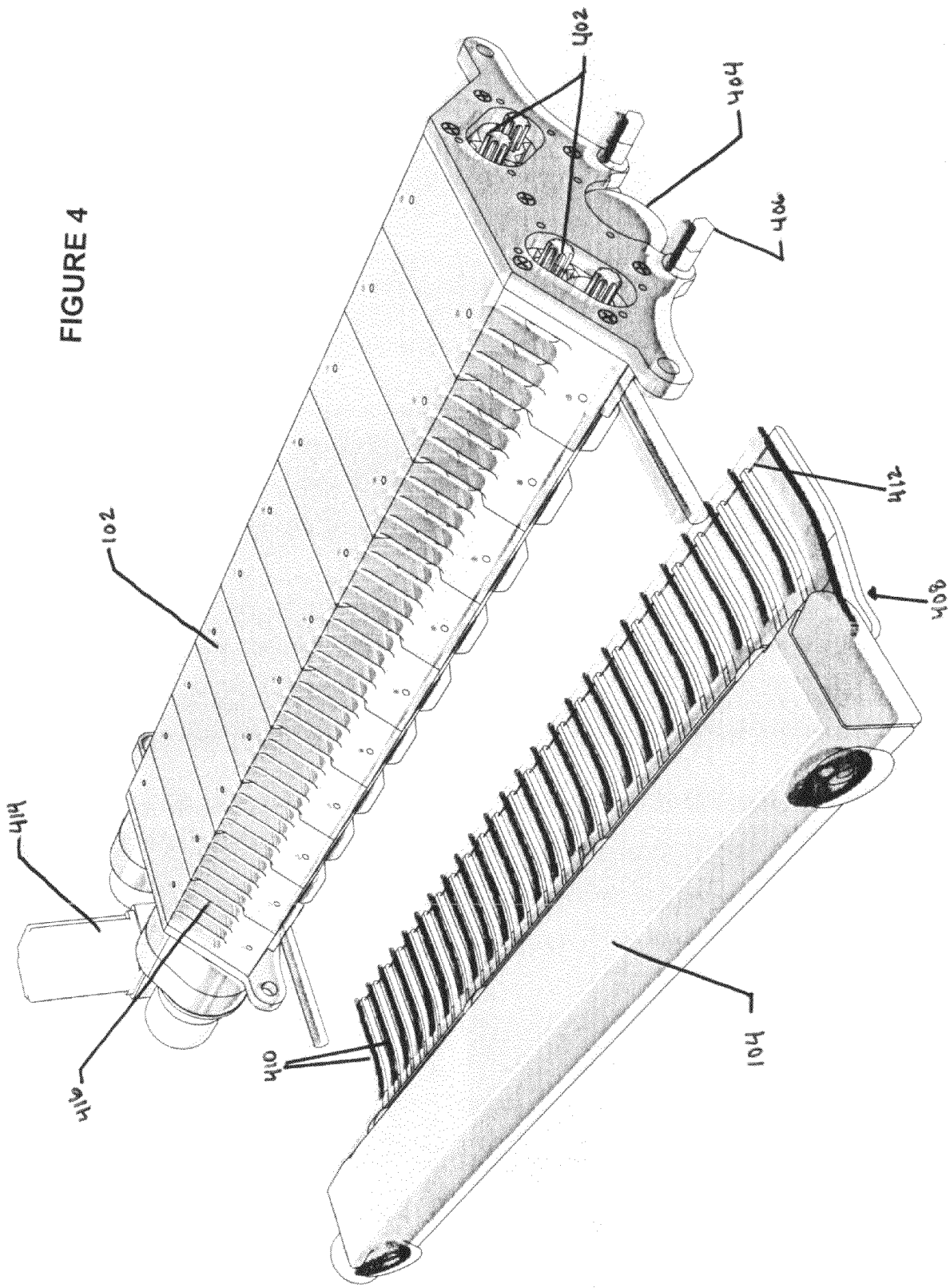
FIG. 4 is a perspective view of an extruder assembly and a wire cutting assembly according to an embodiment of the invention.

With reference to FIG. 4, the extruder assembly 102 of the present embodiment is shown detached from the wire cutting assembly 104. FIG. 4 shows in more detail additional components of the present embodiment, including extruder pumps 402 (two, in this embodiment), a rotating extruder die 404, and a quick disconnect mechanism 406 for disconnecting the rotating extruder die 404, all located on the extruder assembly 102. The extruder pumps 406 serve to pump product into the extruder die 404. The wire cutting assembly 104 of this embodiment contains a harp 408 with a plurality of grooves 410 with a wire 412 running across the grooves 410 for the length of the harp 408. The wire cutting assembly 104, as depicted, is easily removable from the rest of the apparatus. Servo drives and gear boxes 414 provide for precision control of the component parts of the present invention, including but not limited to the extruder pumps 402, the wire cutting assembly 104, and the extruder die 404. Further, safety ribs 416 supply an extra layer of protection between the input feed system and the moving parts of the present invention.

Figure 5:
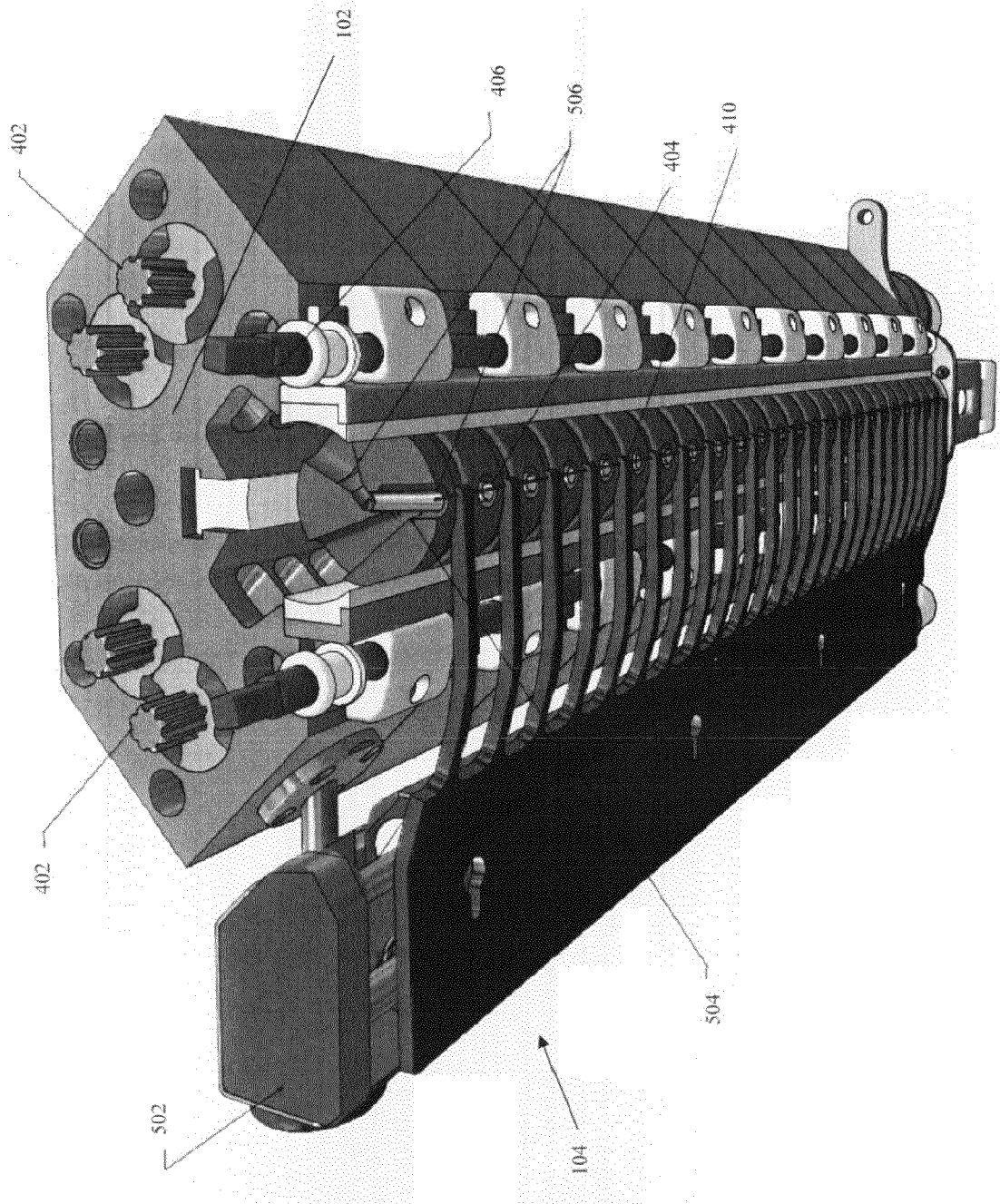
FIG. 5 is a bottom view of an extruder assembly and a wire cutting assembly according to an embodiment of the invention

With reference now to FIG. 5, the wire cutting assembly 104 is equipped with an adjustment mechanism 502 to advance or retard the wire position of the wire assembly 104. FIG. 5 further shows a detailed view of the rotating extruder die 404. Shown for two-color extrusion, two product channels 504 and 506 for receiving product are present on the rotating extruder die 404.

A first advantage of an embodiment of the present invention is that one standard extruder assembly 102 may be provided with a diverse array of primary feed systems, making the system available for a wide range of products. A variety of primary feed systems may be mounted on single extruder assembly 102. As a result, the primary feed system may be quickly changed. For example, in order to better accommodate jams, jellies, and light viscose creams and light viscose dough, stainless steel hoppers which are completely jacketed may be utilized, providing for accurate temperature controls. Such an embodiment is shown in FIG. 2. By way of further example, for aerated creams and/or ice creams, one or more hoppers may be simply replaced by a feeding manifold, providing a consistent supply to the pump system of the product while guaranteeing a high level of accuracy, such as shown in FIG. 3. As another example, for more viscose dough and heavy creams, stainless steel jacketed hoppers may be provided with wide-diameter electro-servo driven feed rollers in order to help provide consistent feed to the pump system. FIG. 1 shows an embodiment with driven feed rolls 110.

A second advantage of an embodiment of the present invention is that the lobes in the extruder pumps 402 are single profile and of full machine width. As shown in FIG. 5, no intermediate bearings, plates, or other obstacles are used, keeping the extruder pumps 402 completely free for any number or position of nozzles. As a result, the entire width of the machine may be used for the extrusion of slabs of product.

A third advantage of an embodiment of the present invention is that, for low speed depositing, wire cutting, and the continuous production of extruded product, the product may be dropped onto a belt or directly onto an oven band. Since production often requires the extruding nozzles to keep pace with the velocity of the belt or band, the extrusion system of the present invention is designed to be used at an exceptionally high pacing speed. Moving a complete extruder assembly 102 is possible, but due to the substantial weight of the extruder (including cables, feeding tubes, etc.), it is severely limited in speed and causes several critical maintenance points. Additionally, it is often difficult to cover all of the moving parts of a complete moving machine, creating numerous safety concerns around the machine.

Instead, the extrusion system of the present invention employs a pacing stencil die. With reference to FIG. 1, the complete machine may be placed on a pivot stand 106, allowing the extruder die 404 shown in FIG. 5 to follow the band or belt at a precisely controlled and reciprocating rotating speed for the desired deposits.

FIG. 6 illustrates the pacing extruder die 404, as applied to two-color extrusion. One of ordinary skill in the art will note that any number of product lanes may be used without disrupting the process herein disclosed. The extruder die 404 begins in a "dwell" position depicted in FIG. 6A, having already had product pumped into it by the two extruder pumps 402. The wire 412 meanwhile moves up in a substantially vertical motion into cutting position. As used herein, "substantially vertical motion" shall mean the movement of an object in a vertical motion with negligible to no movement in any other direction. As shown in FIG. 6B, the extruder die 404 rotates forward at a programmed velocity, the speed adaptable to a speed of production by means of the drives and gearboxes 414. As the extruder die 404 rotates, the extruded product is cut by the stationary wire 412.

Figure 6A:
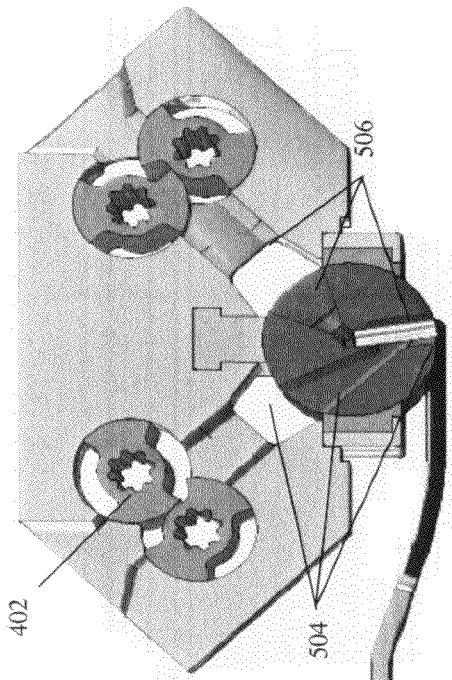
FIG. 6A is a front view of an extruder assembly and a wire cutting assembly according to an embodiment of the invention.
Figure 6B:
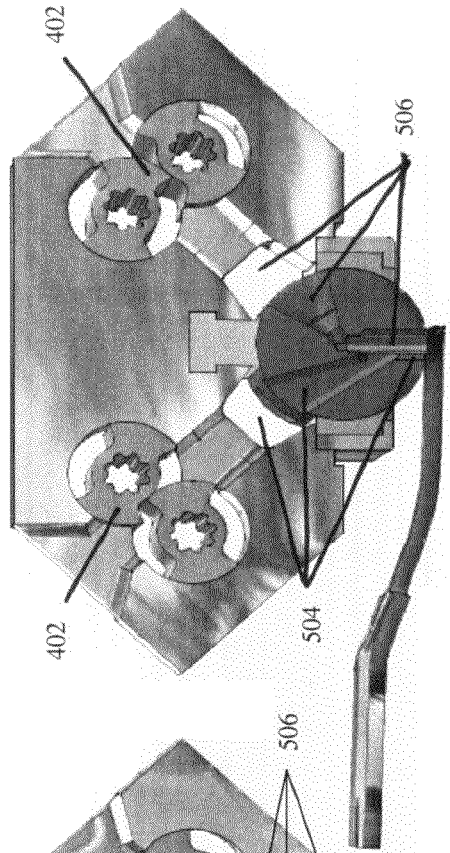
FIG. 6B is a front view of an extruder assembly and a wire cutting assembly according to an embodiment of the invention.
Figure 6C:
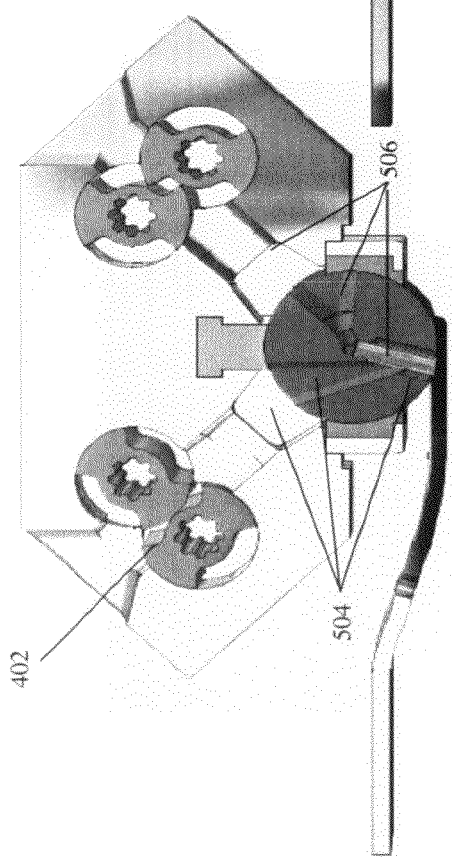
FIG. 6C is a front view of an extruder assembly and a wire cutting assembly according to an embodiment of the invention.
Figure 6D:
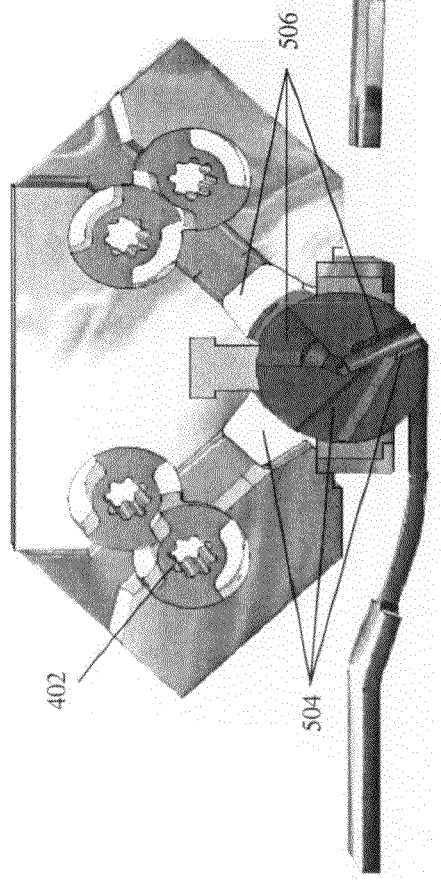
FIG. 6D is a front view of an extruder assembly and a wire cutting assembly according to an embodiment of the invention.

Once the extruder die 404 reaches a "final well position" depicted in FIG. 6C, the wire moves down in a substantially vertical motion to a "clear" position. At this point the extruded product may be deposited. The stencil die may then rotate backwards, reaching the position depicted in FIG. 6A, with the wire in the "clear" position. Now the extruder pumps 402 may pump further product into the rotating extruder die 404, which is positioned to receive the product via two product channels 504 and 506. Another iteration of the described process is then ready to proceed. As a result of this process, the need to move the complete machine is eliminated, the requirement for maintenance is tempered, and the number of safety concerns is significantly reduced, all while achieving accurate and speedy deposits.

Because of the rotating extruder die 404, the complete extruder may be pivoted up to 450, giving ample access to the bottom of the unit for sanitation or maintenance. The use of this adjustment, however, is not required to control the height of an oven band and take advantage of accurate depositing or extruding.

A fourth advantage of an embodiment of the present invention is that, as demonstrated in the discussion of the third advantage, wire cutting requires only slight vertical movement, and negligible to no horizontal movement, of the wire 412 on the wire cutting assembly 104. The need for horizontal movement is eliminated because of the rotating motion of the pacing extruder die 404. The upward vertical movement puts the wire in position to cut as the extruder die 404 rotates and the downward vertical motion frees the wire from the dough when the wire cutting is complete. In an embodiment, the wire 412 of the wire cutting assembly 104 may be electro-servo controlled. Consequently, the simplicity of the vertical motion facilitates rapid cutting speeds. Further, within a few minutes, both the harp 408 (to which the wire 412 is attached) and the complete wire-cut assembly 104 (including the motor drive) may be removed from the machine.

A fifth advantage of an embodiment of the present invention is that the pump body 402 is constructed from segments and assembled in a unique and sanitary manner. Moreover, by using standard components, machines of any required width may be efficiently assembled.

It is thus believed that the operation and construction of various embodiments of the present invention will be apparent from the foregoing description. It will be obvious that various changes and modifications may be made therein without departing form the spirit and scope of the present invention.

What is claimed is:

1. A food manufacturing apparatus for manufacturing food products by co-extrusion, the apparatus comprising:
    an extruder assembly having an upper side and a bottom side, and including a rotating extruder die;
    a feed system for inputting a plurality of materials, said feed system including at least two separate single mass feed assemblies extending in a transverse direction and being arranged one behind the other above said extruder assembly, wherein said extruder assembly receives single masses from said separate single mass feed assemblies on the upper side thereof and co-extrudes said single masses on the bottom side thereof with said rotating extruder die extending in a transverse direction and co-extruding the single masses at the bottom side in a downward direction;
    said extruder die having an upper half formed with at least two separate single mass input channels and a lower half formed with at least two coaxial output channels;
    said extruder assembly having at least two separate single mass product channels leading from said separate single mass feed assemblies to the upper side of said extruder die;
    said extruder assembly including a pump system with separate pump assemblies disposed within said separate single mass product channels; and
    a cutting assembly for cutting the co-extruded product streams extruded by said extruder die, said cutting assembly being disposed next to said extruder assembly and including a harp with a cutting portion disposed near the bottom side of said extruder die, said cutting portion of said harp being formed with at least one groove and having a wire running across said at least one groove.

2. The apparatus according to claim 1, wherein said extruder die further comprises at least one cutting aperture.

3. The apparatus according to claim 2, wherein said at least one cutting aperture of said extruder die corresponds in size with said at least one groove of said cutting portion of said harp of said cutting assembly.

4. The apparatus according to claim 1, wherein said cutting assembly comprises a harp that is movable with a cutting portion thereof by a substantially vertical motion between a lower clear position and an upper cutting position.

5. The apparatus according to claim 1, which further comprises a pivot stand supporting the apparatus.

6. The apparatus according to claim 1, wherein said separate single mass feed assemblies are removably attached to said extruder assembly.

7. The apparatus according to claim 6, wherein said separate single mass feed assemblies are open hoppers including driven feed rolls.

8. The apparatus according to claim 6, wherein said separate single mass feed assemblies are open stainless steel hoppers.

9. The apparatus according to claim 6, wherein said separate single mass feed assemblies are closed manifolds.

10. The apparatus according to claim 1, wherein said separate pump assemblies extend in the transverse direction over an entire width of said extruder assembly and do not comprise intermediate bearings, plates, or other obstacles.

* * * * *